United States Patent
Goto

[11] Patent Number: 6,144,496
[45] Date of Patent: Nov. 7, 2000

[54] LENTICULAR LENS SHEET, METHOD OF MANUFACTURING THE SAME, AND TRANSMISSION TYPE SCREEN

[75] Inventor: Masahiro Goto, Tokyo-To, Japan

[73] Assignee: Dai Nippon Printing Co., Ltd., Japan

[21] Appl. No.: 09/308,174

[22] PCT Filed: Sep. 21, 1998

[86] PCT No.: PCT/JP98/04244

§ 371 Date: May 17, 1999

§ 102(e) Date: May 17, 1999

[87] PCT Pub. No.: WO99/15918

PCT Pub. Date: Apr. 1, 1999

[30] Foreign Application Priority Data

Sep. 19, 1997 [JP] Japan .................................. 9-255175

[51] Int. Cl.⁷ ............................. G02B 27/10; G03B 21/60
[52] U.S. Cl. ........................................... 359/619; 620/455
[58] Field of Search ................................. 359/619, 620, 359/621, 622, 623, 624, 625, 626, 628, 452, 453, 454, 455, 456, 457, 458, 459

[56] References Cited

U.S. PATENT DOCUMENTS

| | | | |
|---|---|---|---|
| 4,509,823 | 4/1985 | Moriguchi et al. | 359/457 |
| 4,561,720 | 12/1985 | Clausen | 359/457 |
| 4,941,732 | 7/1990 | Umeda et al. | 359/456 |
| 4,993,806 | 2/1991 | Clausen et al. | 359/456 |
| 5,166,824 | 11/1992 | Nishiguchi et al. | 359/456 |
| 5,554,432 | 9/1996 | Sandor et al. | 428/157 |
| 5,555,476 | 9/1996 | Suzuki et al. | 359/40 |
| 5,760,955 | 6/1998 | Goldenberg et al. | 359/456 |
| 5,877,893 | 3/1999 | Kim | 359/456 |
| 6,002,829 | 12/1999 | Winston et al. | 385/146 |

FOREIGN PATENT DOCUMENTS

| | | |
|---|---|---|
| 55-87140 | 7/1980 | Japan . |
| 58-72935 | 5/1983 | Japan . |
| 59-214837 | 12/1984 | Japan . |
| 63-273850 | 11/1988 | Japan . |
| 1-167829 | 7/1989 | Japan . |
| 4-323633 | 11/1992 | Japan . |
| 6-194741 | 7/1994 | Japan . |
| 7-64071 | 3/1995 | Japan . |

OTHER PUBLICATIONS

Microfilm of the specification and drawings annexed to the request of Japanese Utility Model Application No. 39963/1981 (Laid Open No. 153334/1981) (Sony Corp), Sep. 27, 1982 pp. 5 to 9.

*Primary Examiner*—Georgia Epps
*Assistant Examiner*—Saeed Seyrafi
*Attorney, Agent, or Firm*—Parkhurst & Wendel, L.L.P.

[57] ABSTRACT

The lenticular lens sheet 10 has a lenticular lens portion 11 made of an ionizing radiation curable resin or the like on the light incident side of the sheet. The slit-shaped light absorbing portion 12 is provided in the top of each of the lenticular lenses of the lenticular lens portion 11. The lenticular lens sheet 10 also has a substantially planar output surface 13 on the output side of the sheet. The output surface 13 is provided with a surface-coating layer 14 which includes at least one of a hard-coating layer, a reflection-preventing-coating layer, a polarizing-film layer and a rewritable-coating layer.

13 Claims, 5 Drawing Sheets

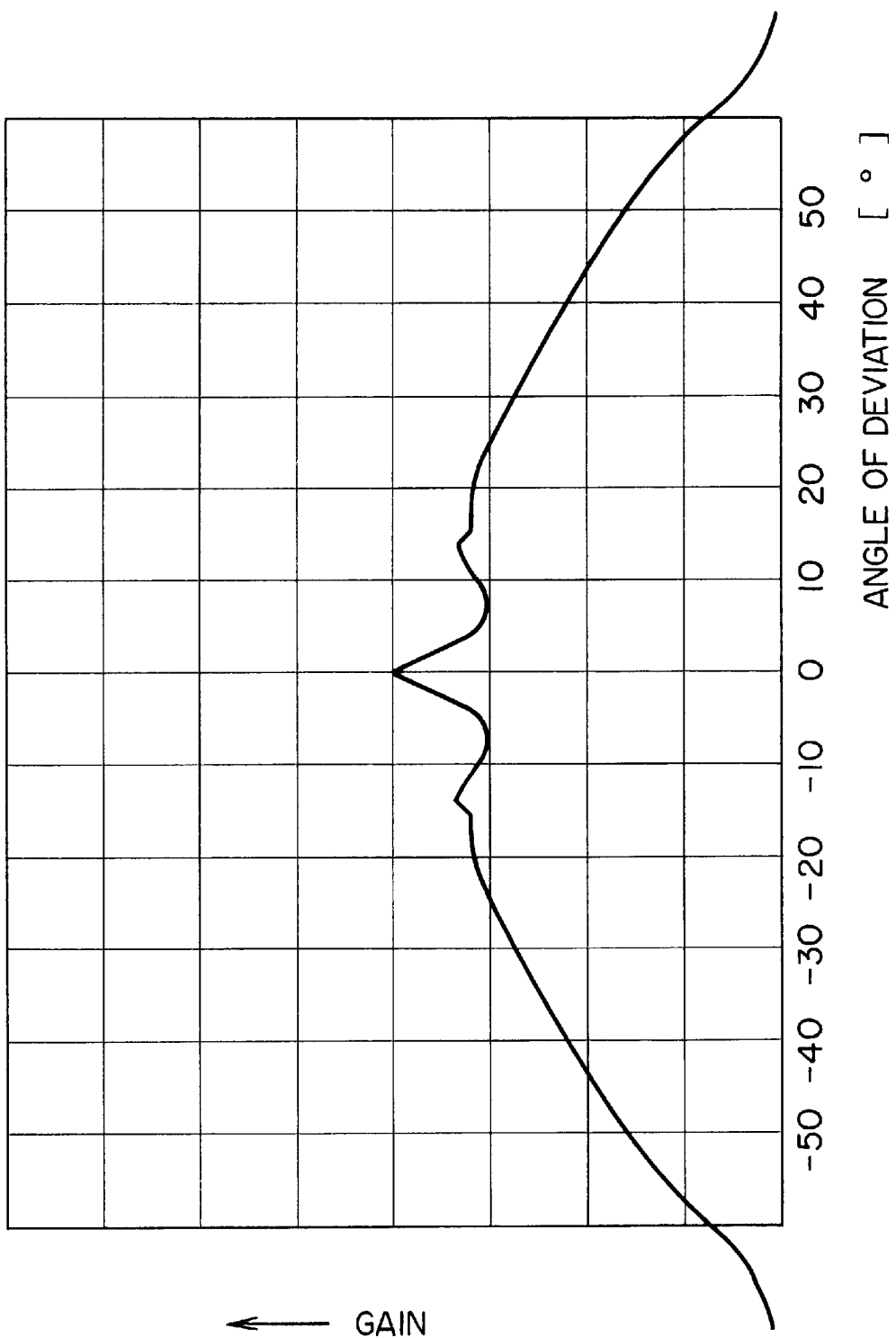
F I G. 3

LENTICULAR LENS SHEET, METHOD OF MANUFACTURING THE SAME, AND TRANSMISSION TYPE SCREEN

BACKGROUND OF THE INVENTION

1. Field of the Invention

This invention relates to a lenticular lens sheet used for televisions of rear projection type, a manufacturing method of the lenticular lens sheet and a transmission screen.

2. Description of the related art

There are two types of lenticular lens sheets. One type is a two-side lenticular lens sheet, and the other type is a one-side lenticular lens sheet.

The two-side lenticular lens sheet comprises: an incident side lenticular lens provided on the incident side into which the light comes, for diffusing the light in the horizontal direction; and an output side lenticular lens provided on the output side out of which the light is emitted, for calibrating the optical axis. The light absorbing layers (black stripes) are formed on the surface of the output side, at non-output portions (non-transmissive portions) for the light condensed by the incident side lenticular lenses, for enhancing the contrast. In the case of using the two-side lenticular lens sheet, diffusion of the light in the vertical direction is controlled by mixing a diffusing material into the sheet, or by providing lenticular lenses of vertical diffusion type on the incident side of the Fresnel lens arranged on the incident side (light source side) with respect to the two-side lenticular sheet.

On the other hand, contrast of the one-side lenticular lens sheet is enhanced by coloring the sheet.

However, the two-side lenticular lens sheet has a difficulty in achieving a fine lens pitch for the following reasons.

First, the thickness of the sheet becomes thinner if the lens pitch is made smaller, because the output portion has to be provided near the focuses of the incident side lenticular lenses in order to increase the area of the light absorbing layer.

Second, it is difficult to position the incident side lenticular lenses and the output side lenticular lenses to coincide with each other.

Third, the reproduction of the lens shape is not good with the extrusion method.

Furthermore, the two-side lenticular lens sheet tends to be damaged while it is transported or used, because its output side has a minute shape.

On the other hand, it is difficult to sufficiently enhance the contrast of the one-side lenticular lens sheet, even if the sheet is colored.

SUMMARY OF THE INVENTION

Therefore, the object of this invention is to provide a lenticular lens sheet that can achieve fine lens pitch and enhanced contrast, a manufacturing method for the lenticular lens sheet and a transmission screen.

To achieve the above object, this invention provides a lenticular lens sheet comprising; a lenticular lens portion having a plurality of lenticular lenses on an incident side of the sheet, wherein a top portion of each of the lenticular lenses has a slit-shaped light absorbing portion formed in a longitudinal direction of the lenticular lens.

Preferably, the depth of the light absorbing portion is 0.1 to 1.5 times as great as the height of the lens of the lenticular lens portion, and the maximum width of the light absorbing portion is 3 µm to 100 µm. Preferably, the light absorbing portion is formed of an black ink. In addition, a flat portion is preferably formed between two neighboring lenticular lenses in order to make up with a quantity of light absorbed by the light absorbing portion.

Preferably, the surface of the output side of the sheet is substantially planar. Furthermore, the lenticular lens is formed in such a manner that a surface portion of the lens forms an angle not less than 40 degrees with a major plane of a screen. The surface of the output side of the sheet is preferably provided with a surface-coating layer which includes at least one of a hard-coating layer, a reflection-preventing-coating layer, a polarizing-film layer and a rewritable-coating layer.

The lenticular lens portion is preferably made of an ionizing radiation curable resin, such as an ultraviolet ray curable resin or an electron beam curable resin.

Another feature of this invention is that the lenticular lens sheet comprises; a light transmission sheet, and a base film attached to the light transmission sheet, wherein the lenticular lens portion is formed on the base film. Preferably, a surface of the output side of the light transmission sheet is provided with a surface-coating layer that includes at least one of a hard-coating layer, a reflection-preventing-coating layer, a polarizing-film layer and a rewritable-coating layer.

Furthermore, this invention provides a method for manufacturing the lenticular lens sheet set forth above, comprising; a step of providing a lenticular lens sheet body having the lenticular lens portion with a plurality of lenticular lenses, a step of forming a slit in a longitudinal direction of the lenticular lens in a top portion of each of the lenticular lens, and a step of causing a black ink to penetrate into the slit formed in the lenticular lens.

Preferably, the step of providing and the step of forming are integrated and these steps consist of: a step of introducing an ionizing radiation curable resin onto a base film, and a step of forming the lenticular lens portion continuously by means of a mold roll having a concavo-convex or complementary shape in an opposite relation to a shape of the lenticular lens portion.

In addition, this invention provides a transmission screen, comprising; a lenticular lens sheet set forth above or manufactured by the above method, and a Fresnel lens sheet arranged on the side of the light source with respect to the lenticular lens sheet.

BRIEF DESCRIPTION OF THE DRAWINGS

FIG. 3 is a graph of a diffusion characteristic in the horizontal direction of a first embodiment for the lentiular lens sheet.

BEST MODE FOR CARRYING OUT THE INVENTION

Embodiments of the invention will now be described in more detail with reference to FIGS. 1 to 5.

First embodiment

Figure 1:
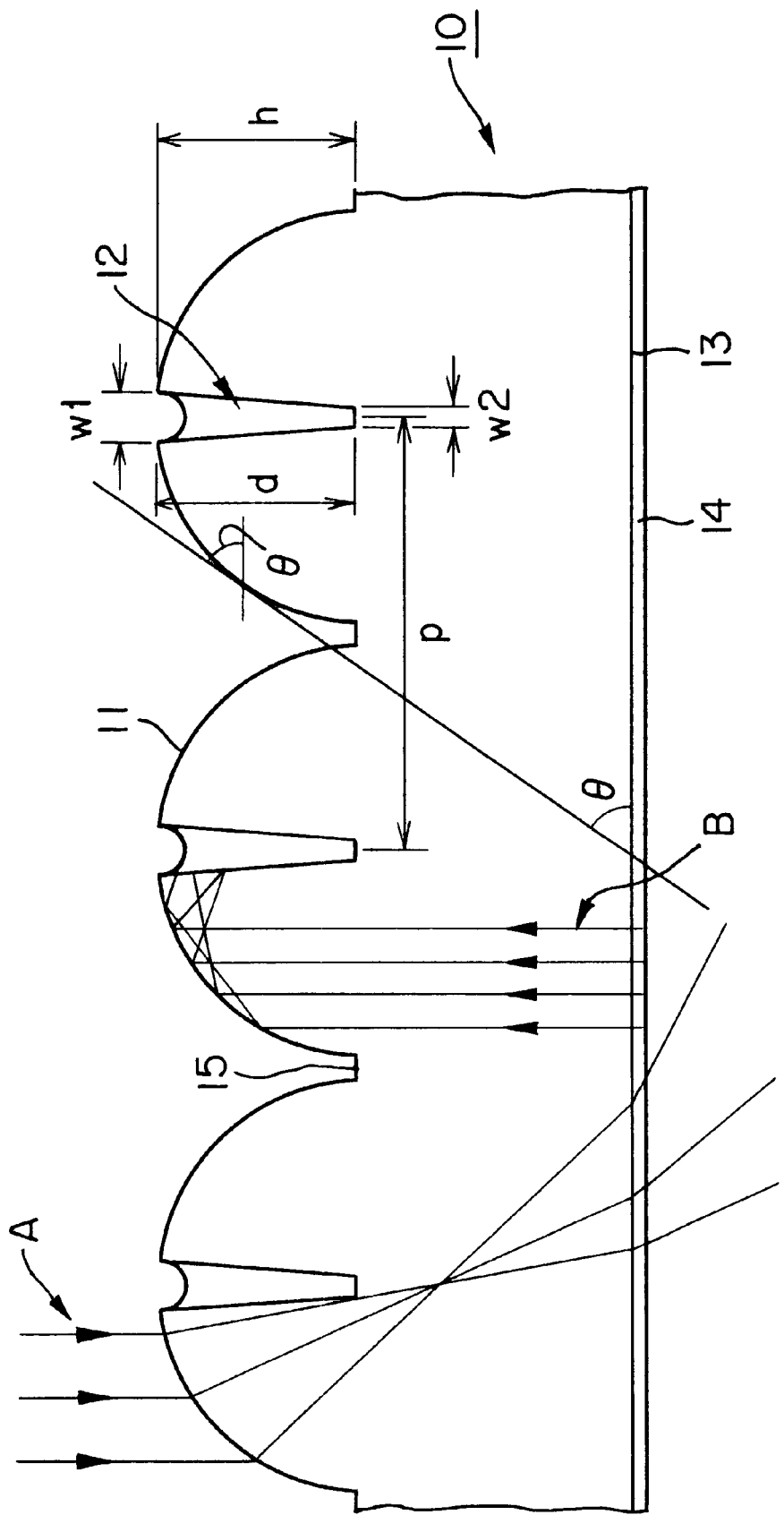
FIG. 1 is a schematic sectional view of a first embodiment of the lenticular lens sheet according to the invention.

FIG. 1 is a schematic sectional view of a first embodiment of the lenticular lens sheet according to the invention. The lenticular lens sheet 10 of this embodiment comprises a lenticular lens portion 11 made of an ionized radiation curable resin such as an ultraviolet ray curable resin or an electron beam curable resin on the light incident side of the sheet. The lenticular lens portion 11 has a plurality of lenticular lenses. The top portion of each lenticular lens has a slit-shaped light absorbing portion 12 formed in the longitudinal direction of the lenticular lens. In FIG. 1, the longitudinal direction of the lenticular lens means a direction perpendicular to the drawing sheet.

The lenticular lens sheet 10 also comprises a substantially planar output surface 13 on the light emission side of the sheet. The output surface 13 is provided with a coating layer 14 that includes at least one of a hard-coating layer, a reflection-preventing-coating layer, a polarizing-film layer and a rewritable-coating layer. A flat portion 15 is formed at each valley of the lenticular lens portions 11 i.e. between two neighboring lenticular lenses.

As shown in FIG. 1, the lenticular lens portion 11 is formed in such a manner that there is a surface portion of the lens that forms an angle θ of more than 40 degrees with a major plane of the screen. The surface portion of the lens lies on the incident side of the lens. The major plane of the screen is parallel to the output surface 13. The angle θ is an angle between the tangent to the surface portion of the lens and the major plane of the screen. The above angle is derived from the fact that the angle at which the ambient light coming into the lenticular lens sheet 10 from the output side totally reflects is about 40 degrees.

The light absorbing portion 12 is formed by forming a slit in each lenticular lens of the lenticular lens portion 11, and causing an ink including a black pigment to penetrate into the slit.

The depth d of the light absorbing portion 12 is preferably shallower than the focus of the lenticular lens for the image light or the depth at which the image light condenses, and deeper than the focus of the reflection ambient light or the depth at which the reflection ambient light condenses. If a normal lenticular lens, whose horizontal half-brightness (half-gain) viewing angle is 20 to 70 degrees, is used, the depth d of the light absorbing portion 12 is preferably 0.1 to 1.5 times as great as the height h of the lens of the lenticular lens. The optimum depth d can be obtained by measuring the half-brightness viewing angle of the light diffusion caused by the lenticular lens.

Preferably the width w of the light absorbing portion 12 is optically as thin as possible to the extent that the mold can be formed and the lens can be shaped. If the width w of the light absorbing portion 12 is too wide, it is difficult to make the black ink penetrate. More specifically, the maximum width $w_{max}$ of the light absorbing portion 12 is preferably from 3 $\mu$m to 100 $\mu$m. If the maximum width $w_{max}$ is less than 3 $\mu$m, it is difficult to form the mold and to make the black ink penetrate into the slit. If the maximum width $w_{max}$ is more than 100/lm, the ratio of the image light coming into the light absorbing portion 12 increases i.e. the efficiency for utilizing the image light decreases. The maximum width $w_{max}$ is preferably not more than 50 $\mu$m to form the light absorbing portion 12 by making the black ink penetrate into the slit.

In this embodiment, the pitch p of the lenticular lenses, i.e. the pitch p of the light absorbing portions 12 is 0.1 mm. The height of the lens is 0.04 mm. The depth d of the light absorbing portion 12 is 0.04 mm, the same as the height of the lens. Regarding the width w of the light absorbing portion 12, the width w1 at the top of the lens is 15 $\mu$m and the width w2 at the bottom of the light absorbing portion 12 is about 5 $\mu$m.

In the lenticular lens sheet 10 of the first embodiment as described above, the image light A is hardly obstructed by the light absorbing portion 12. On the other hand, the ambient light B is totally reflected by the inside surface of each lenticular lens of the lenticular lens portion 11, and is absorbed by the light absorbing portion 12. Thus a fine pitch of the lenticular lenses can be achieved, and an improved contrast can be achieved by effectively preventing the reflection of the ambient light.

In addition, the output surface 13 can be provided with the surface-coating layer because the lenticular lens sheet 10 of this embodiment is the one-side lenticular lens sheet having the lenticular lens portion 11 only on the incident side and the output surface 13 is substantially a plane. This effectively prevents the sheet 10 from be scratched.

The lenticular lens sheet 10 can be used as a transmission type of screen by arranging a Fresnel lens sheet on the light source side of the sheet 10. In this case, a normal Fresnel lens sheet can be used, but preferably the Fresnel lens sheet may be mixed with a light diffusing material or provided with a matt surface. This is because it is desirable to diffuse the image light A in the Fresnel lens since it is difficult to randomly diffuse the image light A in the lenticular lens sheet 10.

Figure 2:
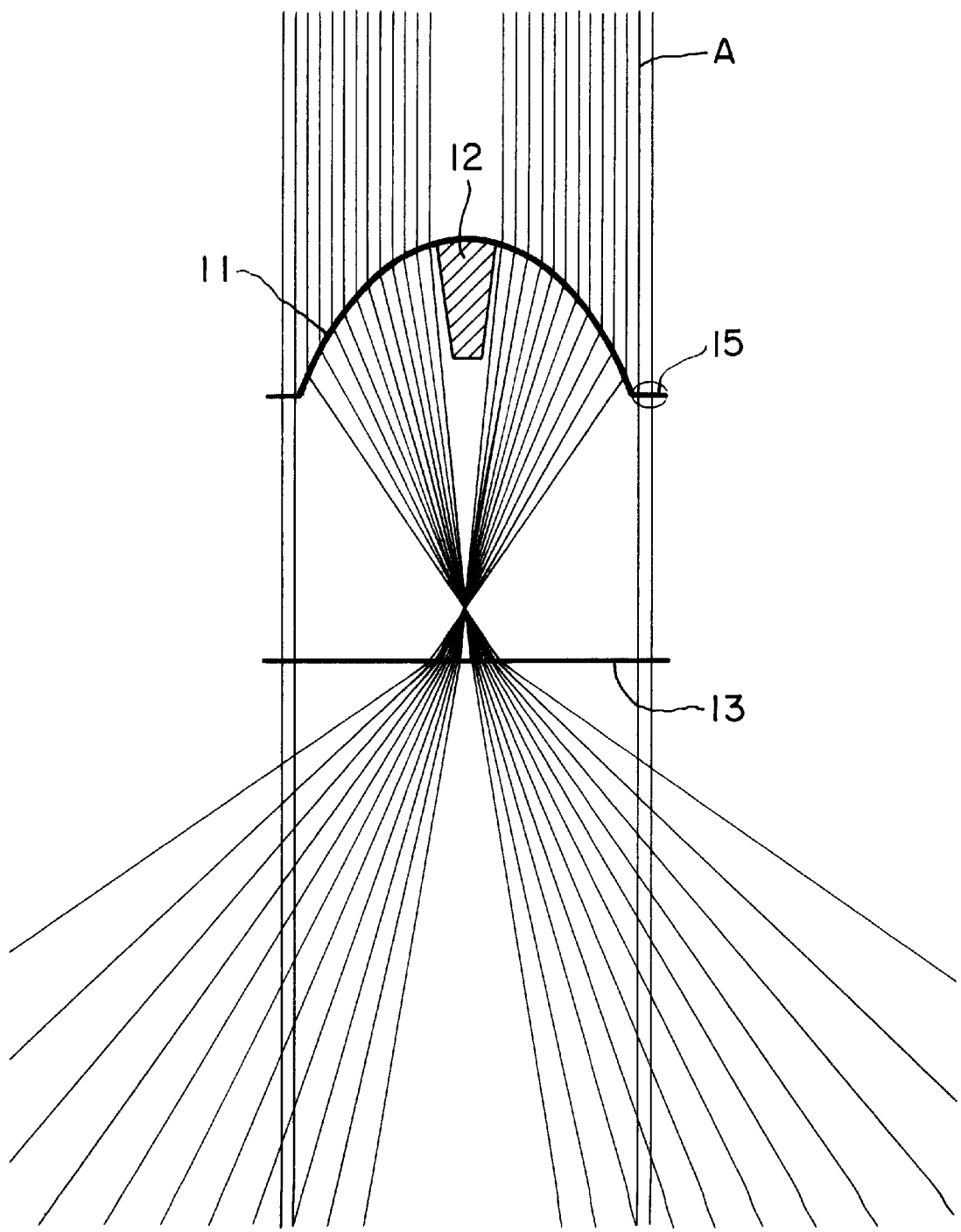
FIG. 2 is an explanatory view of the first embodiment of the lenticular lens sheet and the op al paths of the image light.

FIG. 2 shows the first embodiment of the lenticular lens sheet 10 together with optical paths of the image light A. As shown in FIG. 2, the flat portion 15 helps to make up with the quantity of light corresponding to the image light absorbed by the light absorbing portion 12.

FIG. 3 is a graph of diffusion characteristics in the horizontal direction of the lenticular lens sheet 10 of the first embodiment. As shown in FIG. 3, the quantity of light corresponding to the area more than 50 degrees is larger than that in the conventional lenticular lens.

Second Embodiment

Figure 4:
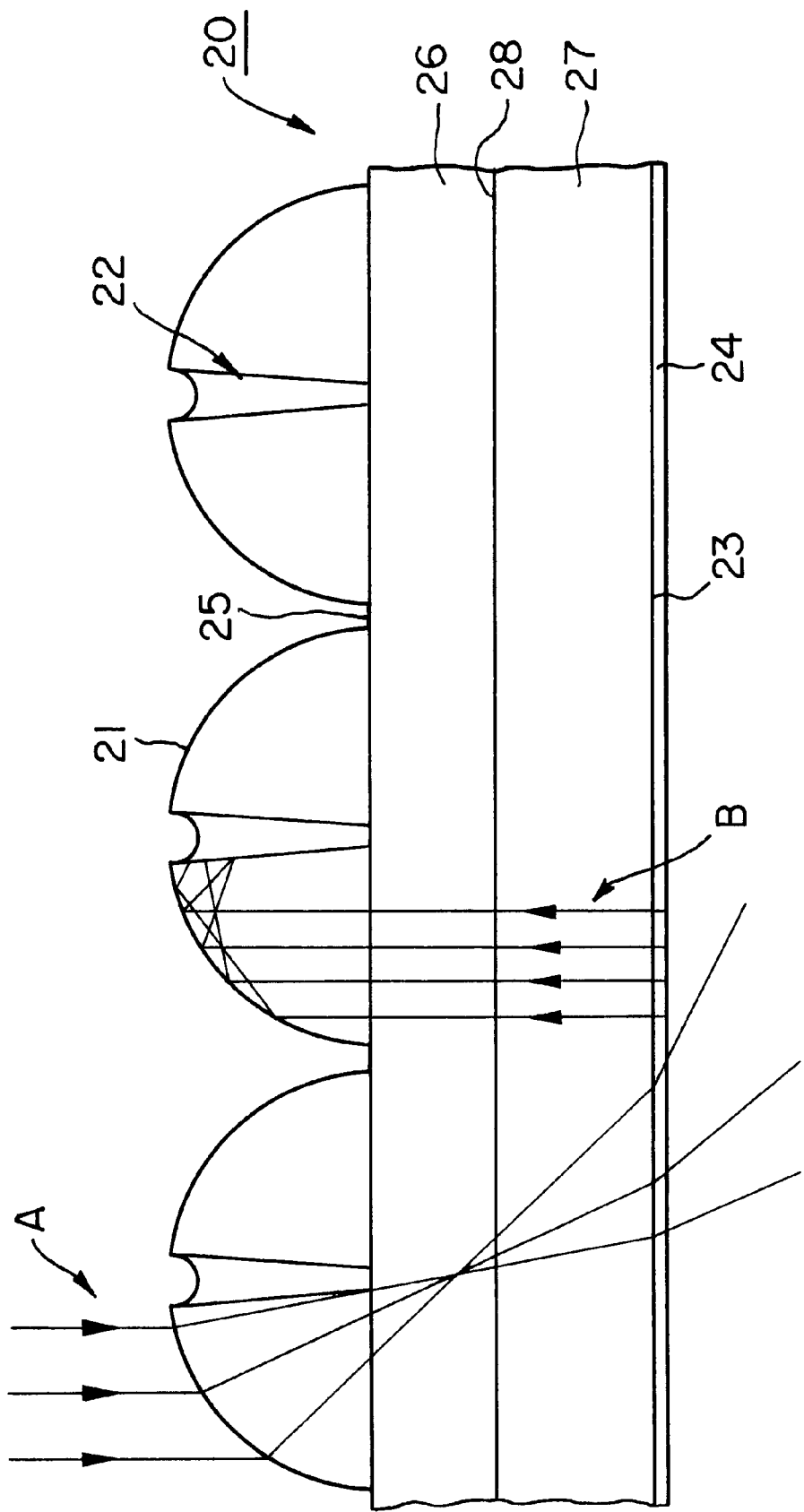
FIG. 4 is a schematic sectional view of a second embodiment of the lenticular lens sheet according to the invention.
Figure 5:
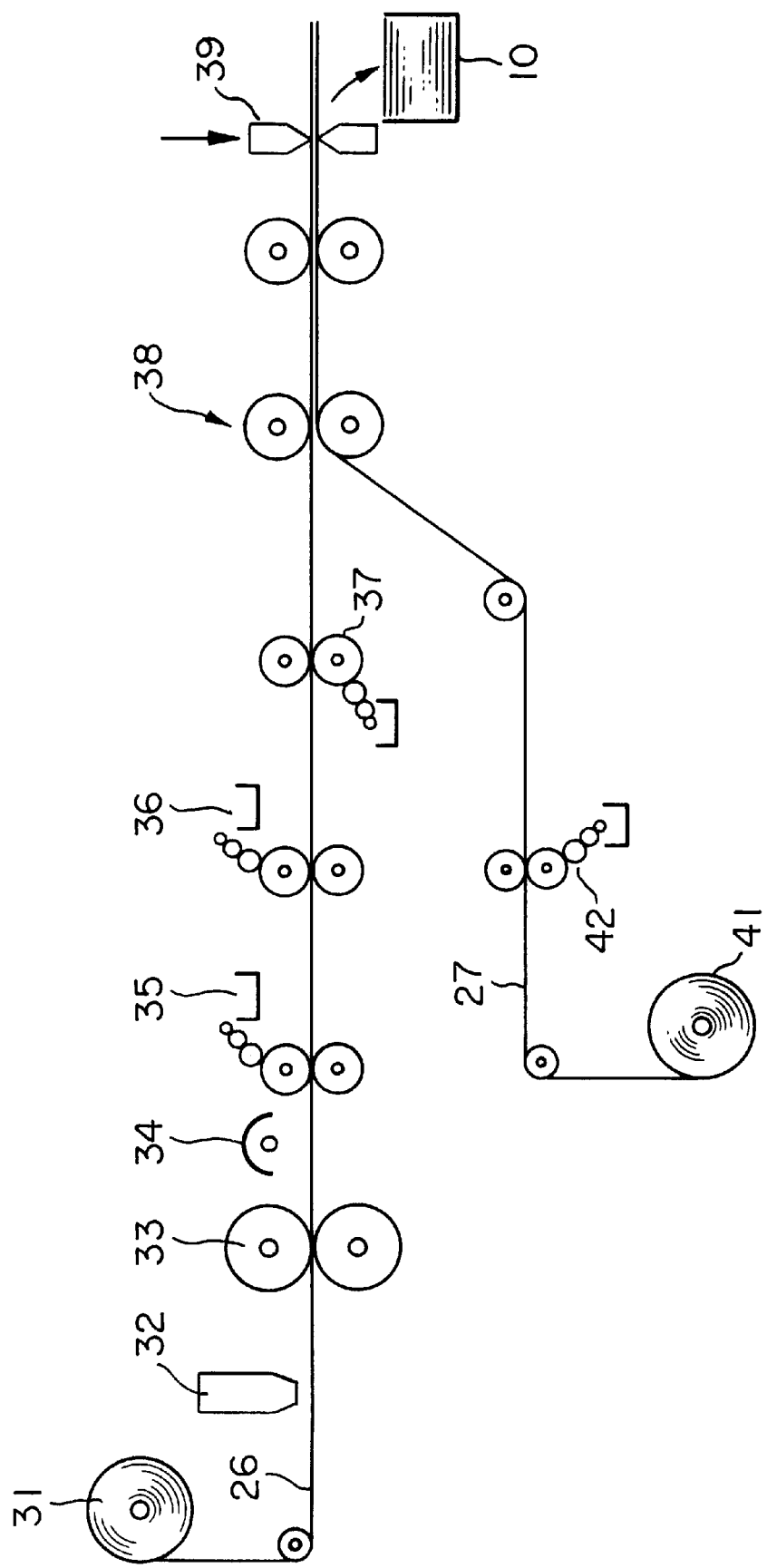
FIG. 5 is a schematic side view of a manufacturing system for the second embodiment of the lenticular lens sheet.

FIG. 4 is a schematic sectional view of a second embodiment of the lenticular lens sheet according to the invention. FIG. 5 is a schematic side view of the manufacturing system for the second embodiment of the lenticular lens sheet. In the second embodiment, the same numeral references correspond to the same elements as the first embodiment. The description of the same elements will not be repeated.

The lenticular lens sheet 20 of the second embodiment comprises a lenticular lens portion 21 made of the ultraviolet ray curable resin on the light incident side of a base film 26 made of a resin such as a polyethylene-terephthalate resin. A light transmission sheet 27 is attached to the surface of the output'side of the base film 26 via an adhesive layer 28. The light transmission sheet 27 is a plate made of an acrylic resin having a thickness of 2 mm. A surface-coating layer 24 is formed on the output side of the sheet 27 by conducting a hard-coating process or a reflection-preventing coating process.

As shown in FIG. 5, in the manufacturing system for this embodiment, the base film 26 is supplied from a roll 31. Then the ultraviolet ray curable resin is applied to the upper surface of the base film 26 by means of a dispenser 32. Then the lenticular lens portion 21 is formed continuously by a mold-roll 33 which has a concavo-convex or complementary surface shape in an opposite relation to the shape of the lenticular lens portion 21 shown in FIG. 4. Then the lenticular lens portion 21 is hardened or cured by an UV lamp 34.

Then, a black ink is applied to the slits at the tops of the lenticular lens portion 21 (to the areas corresponding to the light absorbing portions 22), so that the black ink penetrates into the slits. Then, the surplus ink is removed by means of a removing roller 36.

In addition, the adhesive 28 is applied to the under surface of the base film 26 by means of a coater 37.

On the other hand, a light transmission base sheet 27 is supplied from a roll 41. A coater 42 conducts a surface treatment such as a hard-coating process, reflection-preventing process or polarizing-film forming process to the under surface of the base sheet 27. Then the base film 26 to which the adhesive 28 has been applied is stuck to the base sheet 27 by pressing rollers 38. Finally, the base film 26 and the base sheet 27 are cut off to a predetermined length by a cutter 39. The surface treatment could be previously conducted to the base sheet 27 in another separate step.

As described above, according to the two embodiments of the invention, reflected ambient light is effectively absorbed, contrast can be remarkably enhanced and fine pitch can be easily achieved, because the slit-shaped light absorbing portions 12, 22 are provided in the lenticular lens portion 11, 21 on the light incident side of the sheet.

Furthermore, the surface-coating process such as a hard-coating process or reflection-preventing-coating process can be easily conducted because the output surface is substantially a plane.

This invention is not limited by the above embodiments and can be modified within the scope of the claims. For example, also in two-side lenticular lens sheets, contrast can be enhanced by providing slit-shaped light absorbing portions in the lenticular lens portion on the incident side of the sheet.

What is claimed is:

1. A lenticular lens sheet comprising:
    a lenticular lens portion having a plurality of lenticular lenses on an incident side of said lens sheet, wherein
    (1) a top portion of each of the lenticular lenses has a slit-shaped light absorbing portion formed in a longitudinal direction of each lenticular lens, and
    (2) the light absorbing portion has a depth of 0.1 to 1.5 times as great as a height of the lenticular lens.
2. A lenticular lens sheet according to claim 1, wherein:
    the light absorbing portion has a maximum width of 3 μm to 100 μm.
3. A lenticular lens sheet according to claim 1, wherein:
    the light absorbing portion is made of a black ink.
4. A lenticular lens sheet according to claim 1, wherein:
    a flat portion is formed between two neighboring lenticular lenses in order to make up with a quantity of light absorbed by the light absorbing portion.
5. A lenticular lens sheet according to claim 1, wherein:
    the sheet has a surface on an output side thereof, said surface being substantially planar.
6. A lenticular lens sheet according to claim 1, wherein:
    the lenticular lens is formed in such a manner that a surface portion of the lens forms an angle not less than 40 degrees with major plane of a screen.
7. A lenticular lens sheet according to claim 1, wherein:
    the sheet has a surface of an output side which is provided with a surface-coating layer which includes at least one of a hard-coating layer, a reflection-preventing-coating layer, a polarizing-film layer and a rewritable-coating layer.
8. A lenticular lens sheet according to claim 1, wherein:
    the lenticular lens portion is made of an ionizing radiation cured resin.
9. A lenticular lens sheet according to claim 8, comprising;
    a light transmission sheet, and
    a base film attached to the light transmission sheet,
    wherein the lenticular lens portion is formed on the base film.
10. A lenticular lens sheet according to claim 9, wherein:
    the light transmission sheet has a surface of an output side which is provided with a surface coating layer which includes at least one of a hard-coating layer, a reflection-preventing-coating layer, a polarizing-film layer and a rewritable-coating layer.
11. A transmission type of screen, comprising;
    a lenticular lens sheet claimed by any of claim 1 and
    a Fresnel lens sheet arranged on a side of a light source with respect to the lenticular lens sheet.
12. A method of manufacturing a lenticular lens sheet comprising a lenticular portion having a plurality of lenticular lenses on an incident side of the sheet, wherein a top portion of each of the lenticular lenses has a slit-shaped light absorbing portion formed in a longitudinal direction of each lenticular lens, said method comprising:
    providing a lenticular lens sheet body having a lenticular lens portion with a plurality of lenticular lenses;
    forming a slit in a longitudinal direction of each of the lenticular lenses in a top portion of each lenticular lens, and
    causing a black ink to penetrate into the slit formed in each lenticular lens.
13. A method of manufacturing the lenticular lens sheet according to claim 12, wherein:
    the step of providing a lenticular lens sheet body and the step of forming a slit are integrated and these steps consist of:
    introducing an ionizing radiation curable resin on a base film, and
    forming the lenticular lens portion continuously by means of a mold roll having a concavo-convex or complementary shape in an opposite relation to a shape of the lenticular lens portion.

* * * * *